United States Patent
Rainal

[15] 3,699,450
[45] Oct. 17, 1972

[54] APPARATUS FOR MEASURING LOW LEVEL POWER

[72] Inventor: Attilio Joseph Rainal, Convent, N.J.

[73] Assignee: Bell Telephone Laboratories, Incorporated, Murray Hill, N.J.

[22] Filed: Aug. 26, 1970

[21] Appl. No.: 67,033

[52] U.S. Cl..................325/363, 250/83 R, 325/474
[51] Int. Cl........................................................G01t
[58] Field of Search ......235/181; 325/366, 367, 473, 325/474, 482, 347, 67, 363, 364; 324/77; 250/83.3, 83 R; 343/112, 113

[56] References Cited

UNITED STATES PATENTS 3,296,581   1/1967   Warner......................325/474
3,446,559   5/1969   Astheimer et al........325/67 X
3,544,900   12/1970  Beyer......................325/473 X Primary Examiner—Benedict V. Safourek
Attorney—R. J. Guenther and William L. Keefauver

[57] ABSTRACT

The prior art discloses a correlation receiver in which incoming energy is equally divided between two parallel paths, with the path outputs applied to a multiplier to produce an output indicative of the level of the energy. The present disclosure introduces bandpass limiters in the parallel paths, thus enabling lower levels of input energy to be measured.

2 Claims, 1 Drawing Figure

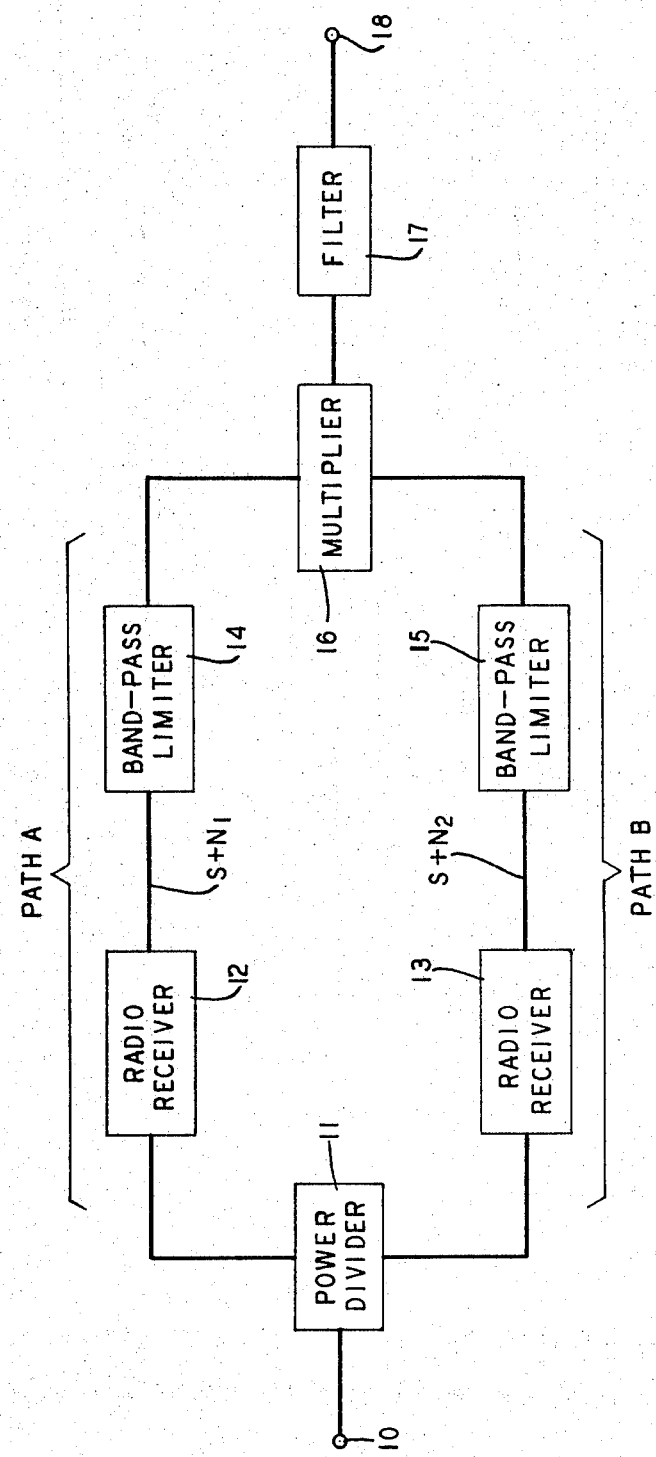

APPARATUS FOR MEASURING LOW LEVEL POWER

BACKGROUND OF THE INVENTION

1. Field of the Invention

This invention relates to correlation receivers for measuring waves at relatively low power levels.

2. Description of the Prior Art

The measurement of electrical waves of less than $10^{-15}$ watts presents a problem because of masking produced by locally generated noise and gain fluctuations. This is true, for example, in the radiometry field wherein the absolute temperature of a body is determined by measuring the relatively low level microwave energy radiated by the body. This problem and various apparatus designed in attempts to overcome it are discussed in detail by M. E. Tiuri in "Radio Astronomy Receivers," pages 930–938 of *IEEE Transactions on Antennas and Propagation*, December 1964.

One type of apparatus discussed in the Tiuri article is the so-called correlation receiver. In this type of apparatus input waves are evenly divided between two channels where the waves are operated upon by identical radio receivers, amplifiers or the like as required by the nature of the input waves. The channel outputs, which in the Tiuri article comprise IF outputs from a pair of radio receivers, are applied to a multiplier. The multiplier output is, in turn, filtered and produced as the receiver output voltage.

From a nonmathematical standpoint, the receiver output voltage may be appreciated by making several assumptions.

First consider the channels to be noise free. In this case, the output voltage would fluctuate around a d.c. voltage level. This level would be determined by the input power level and the nominal gains within the channels. On the other hand, the fluctuation amplitude would be influenced by fluctuations of the channel gains about their nominal values.

Next, consider uncorrelated noise to be added to the correlated input waves applied to the multiplier. Some of the correlation of the input waves as applied to the multiplier is, in effect, destroyed. This results in a smaller d.c. voltage component than that which would be produced in the absence of noise.

Finally consider the case where input waves do not exist so that the multiplier would receive only uncorrelated noise from the channels. The output voltage would then fluctuate around a zero d.c. voltage level.

Intuitively, the noise may be viewed as a reference power source against which the input wave power is measured in a ratio manner. In particular, the larger the input power is relative to the noise power, the closer the d.c. component is to the value possible in the absence of any noise power. On the other hand, the smaller the input wave power is relative to the noise power, the smaller the d.c. output component is relative to the value possible in the absence of any noise power.

As discussed above, the d.c. output components appear in combination with fluctuating voltage components which are influenced by gain fluctuations. The fluctuating components make it difficult to obtain accurate measurements, especially when the d.c. component is relatively small.

SUMMARY OF THE INVENTION

An object of the present invention is to reduce the fluctuation appearing in the output voltage of a correlation type receiver when gain fluctuations are present.

This and other objects are achieved in accordance with the invention by inserting bandpass limiters in the parallel paths of a correlation receiver. (Bandpass limiters—as distinguished from "hard" limiters—are described in the text *An Introduction to the Theory of Random Signals and Noise*, by W. B. Davenport, Jr. and W. L. Root, McGraw-Hill Book Company, Inc., 1958, page 288.) These limiters eliminate substantially all amplitude modulation in the inputs to the receiver multiplier. With these additions, the receiver multiplier and the filter immediately following it function as a phase detector in that the d.c. component of the receiver output voltage is related to the cosine of the phase difference between the two inputs to the multiplier. The fluctuation of this output voltage caused by receiver gain fluctuations is substantially reduced because of the substantial elimination of amplitude modulation in the input to the multiplier.

These and other objects and features of the invention will become apparent from a study of the disclosed embodiment.

BRIEF DESCRIPTION OF THE DRAWING

The drawing shows a block diagram of an embodiment of the invention.

DESCRIPTION OF THE DISCLOSED EMBODIMENT

For convenience, the disclosed embodiment is shown for use with microwave input waves. Embodiments of the invention may be readily designed for use with other frequency ranges of input waves.

In the drawing an input terminal 10 receives waves which may include such things as antenna noise, waveguide losses, et cetera. These waves are equally divided between a pair of parallel paths A and B by a power divider 11. The power divider should minimize any energy from feeding between parallel paths A and B.

Divider 11 may take the form of a magic T having an insignificant noise level termination connected to its fourth input. A feature of the present invention is that problems discussed by E. J. Blum in his article "Sensibilité Des Radio Télescopes Et Récepteurs A Corrélation" on pages 140–163 of the March-April 1959 issue of *Annales D'Astrophysique* with respect to the magic T as a divider have been eliminated. In particular, the simpler magic T may now be used rather than the more sophisticated structure of FIG. 11 of the Blum article. This and similar dividers are known to those skilled in the art.

Parallel paths A and B include radio receivers 12 and 13 which are conventional and produce IF outputs which include noise $N_1$ and $N_2$, respectively. These IF outputs are identified as $S + N_1$ and $S + N_2$, respectively. Noise $N_1$ and $N_2$ may be either large or small compared to the divided input waves but must be nearly statistically independent and preferably of nearly equal magnitude over the bandwidth to be measured. All gains, losses, noise sources, et cetera, in each path are assumed for convenience to be contained in receivers 12 and 13. Furthermore, the receivers are chosen so as to substantially preserve the phasal relationships of the divided input waves.

As shown in the drawing, the IF outputs from receivers 12 and 13 are the algebraic sums of the divided input waves as modified by the receivers and the receiver noise $N_1$ and $N_2$. These IF outputs are amplitude limited by bandpass limiters 14 and 15 so as to remove amplitude modulation prior to applying the outputs to a multiplier 16. The phase difference between these two outputs is detected by multiplier 16 and a filter 17 connected between the multiplier output and an output terminal 18.

As a result of limiters 14 and 15, the ratio between the fluctuating component and the d.c. component of the voltage appearing at terminal 18 is reduced over that produced in the absence of such limiters, thereby permitting a more accurate reading of the d.c. voltage component level in spite of gain fluctuations.

What is claimed is:

1. In combination
   a correlation type receiver having a pair of substantially identical paths where each input wave in a frequency band is substantially equally divided between said paths and outputs from said paths are applied to a multiplier, and
   a pair of bandpass limiters inserted in said paths, respectively, to amplitude limit said outputs from said paths as applied to said multiplier.

2. Apparatus for measuring low level electrical power which apparatus comprises
   signal dividing means having at least one input terminal and two output terminals for dividing an input signal into two substantially equal output signals and, furthermore, which provides isolation between said output terminals,
   first and second substantially identical channels connected to said dividing means outputs, respectively, and each of which includes means having a bandpass limiting stage, and
   a phase detecting means comprising a multiplier and a filter connected in cascade and having two input terminals and an output terminal with said input terminals connected to said channels, respectively.

* * * * *